US008750353B2

(12) United States Patent
Oksman

(10) Patent No.: US 8,750,353 B2
(45) Date of Patent: Jun. 10, 2014

(54) PERFORMANCE STABILIZATION FOR MULTI-CARRIER DSL

(75) Inventor: Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 2256 days.

(21) Appl. No.: 11/500,108

(22) Filed: Aug. 7, 2006

(65) Prior Publication Data
US 2008/0031313 A1 Feb. 7, 2008

(51) Int. Cl.
*H04B 1/38* (2006.01)
(52) U.S. Cl.
USPC .............. 375/222; 375/219; 375/257; 455/73
(58) Field of Classification Search
USPC .............................. 375/222, 219, 257; 455/73
See application file for complete search history.

(56) References Cited

U.S. PATENT DOCUMENTS

| | | | | |
|---|---|---|---|---|
| 6,072,779 | A * | 6/2000 | Tzannes et al. ............... | 370/252 |
| 6,084,917 | A * | 7/2000 | Kao et al. ....................... | 375/260 |
| 6,654,410 | B2 * | 11/2003 | Tzannes ........................ | 375/222 |
| 6,732,281 | B1 * | 5/2004 | Mantri et al. ................. | 713/300 |
| 7,184,467 | B2 * | 2/2007 | Jacobsen et al. ............. | 375/222 |
| 2001/0031016 | A1 * | 10/2001 | Seagraves ...................... | 375/264 |
| 2002/0118733 | A1 * | 8/2002 | Frenkel ......................... | 375/219 |
| 2003/0043894 | A1 | 3/2003 | Sestok, IV et al. | |
| 2003/0076878 | A1 * | 4/2003 | Jones et al. ..................... | 375/219 |
| 2003/0123560 | A1 | 7/2003 | Jacobsen et al. | |
| 2003/0130824 | A1 * | 7/2003 | Antoine et al. .............. | 702/189 |
| 2004/0081191 | A1 * | 4/2004 | Kwon et al. ................... | 370/431 |
| 2005/0111535 | A1 * | 5/2005 | Saey .............................. | 375/222 |
| 2005/0123028 | A1 * | 6/2005 | Cioffi et al. .................... | 375/222 |
| 2006/0062287 | A1 | 3/2006 | Van Bruyssel | |
| 2006/0067388 | A1 * | 3/2006 | Sedarat ......................... | 375/219 |
| 2006/0222098 | A1 * | 10/2006 | Sedarat et al. ................ | 375/260 |

FOREIGN PATENT DOCUMENTS

EP 1 324 557 A1 7/2003

OTHER PUBLICATIONS

"G.VDSL: VDSL2 Firtual Noise Mechanism: Proposed update of working text", ITU Telecommunication Standardization Sector, International Telecommunication Union, COM-15-D 370-E, Geneva, May 16-27, 2005, 9 pgs.
"G.vdsl: VDSL2: Defense Mechanisms to Improve Link Stability in Changing Noise Conditions", ITU—Telecommunication Standardization Sector, Temporary Document SI-065, Stresa, Italy, Oct. 18-22, 2004, 6 pgs.
"G.vdsl: VDSL2 Virtual Noise Mechanism: Proposed Text", ITU—Telecommunication Standardization Sector, Temporary Document HA-073, Huntsville, Alabama, Mar. 21-25, 2005, 5 pgs.
U.S. Appl. No. 10/943,171, filed Sep. 16, 2004, Oksman et al., Entire Document.

* cited by examiner

*Primary Examiner* — Kenneth Lam
(74) *Attorney, Agent, or Firm* — Eschweiler & Associates, LLC

(57) ABSTRACT

One embodiment of the invention relates to a method of performance stabilization for multi-carrier DSL. A real signal-to-noise ratio is measured for each of a plurality of channels. A reference signal-to-noise ratio is calculated based on both the real signal-to-noise ratio and a virtual signal-to-noise ratio. Bit loading is set for at least one of the plurality of channels based on the reference signal-to-noise ratio. Other methods and systems are also disclosed.

10 Claims, 6 Drawing Sheets

PERFORMANCE STABILIZATION FOR MULTI-CARRIER DSL

FIELD OF THE INVENTION

The present invention relates generally to communication systems, and more specifically to methods and systems for limiting the effects of noise in communication systems.

BACKGROUND OF THE INVENTION

Digital-subscriber line (DSL) technology provides users with high-speed data connections over an ordinary telephone line. Modern DSL systems use various methods to modulate data and communicate over this telephone line. One such method of modulation, multi-carrier modulation, divides DSL's frequency band into several channels. Discrete Multi-Tone (DMT) modulation is one popular type of multi-carrier modulation.

Like many other modern technologies, the challenges associated with developing DSL services have been significant. Because DSL is often used over ordinary telephone lines (i.e., pairs of twisted copper wire), limiting the effect of noise has been a particular challenge. Crosstalk is one type of noise wherein the electrical signals on adjacent wires interfere with one another. Crosstalk depends on the number of DSL systems turned ON in a bundle of wires (e.g., cable binder). For example, during the night, the number of DSL systems turned ON may relatively low and, accordingly, crosstalk may be relatively low. In contrast, during late afternoon when businesses are operating and when students have returned home from school, the number of DSL systems turned ON may be relatively high and crosstalk may be relatively high. In addition to crosstalk, other types of non-stationary noise may be occasionally present in DSL systems, including RFI, impulse noise, and numerous others.

Because such noise may cause errors in transmitted data, several methods are known that attempt to reduce the effect of such noise in modern DSL systems, particularly with respect to how bits are loaded onto the several channels in DMT. One traditional method is for a modem to transmit data with extra signal-to-noise ratio (SNR) margin. In this method, one modem measures the SNR of a received signal during initialization, and then transmits data at a higher power (extra SNR margin) to ensure that the data is communicated error free. Alternatively, the modem may use the same transmit power, but increase the SNR margin by loading fewer bits of data onto each subcarrier. In one common embodiment, the transmitting modem will add an extra 6 dB of SNR margin. Because this extra SNR margin is usually based on a measurement that is made during initialization, it may be insufficient to account for the actual noise encountered during data communication due to variations in the noise environment.

An unpleasant situation can occur when a subscriber's modem goes through initialization with no other systems operating in the cable binder. In such a situation, the subscriber's modem determines that there is a relatively low level of noise on the line and transmits data at a relatively low power. As other modems in the binder are turned ON, the noise on the line may increase (e.g., due to crosstalk). Because the subscriber's modem usually determines the bit loading by estimating the SNR of the received signal only at initialization, the modem cannot account for the increase of noise coming after the initialization from the additional modems. Ultimately, the modem's SNR will fall below acceptable levels and excess errors will occur, causing communication failure.

In less dramatic cases, the modem will loose its SNR margin and an on-line reconfiguration process can reduce the bit rate accordingly.

In some implementations modems can adjust their SNR margin-using dynamic power adjustment or dynamic bit loading algorithms, such as on-line bit rate adaptation. However, because these methods require coordination of the adjustments between the modems (which may be impossible due to high error rate in the channel), these methods are often insufficient to avoid communication failure.

Although there are many specific strategies developed for DMT bit loading, these strategies are insufficient to account for noise variations coming from a variety of sources. As a result, an improved method to account for noise from a variety of sources is needed.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

Aspects of the present invention relate to a method of performance stabilization for multi-carrier DSL. A real signal-to-noise ratio is measured for each of a plurality of channels. A reference signal-to-noise ratio is calculated based on both the real signal-to-noise ratio and an expected (virtual) signal-to-noise ratio. Bit loading is set for at least one of the plurality of channels based on the reference signal-to-noise ratio.

The following description and annexed drawings set forth in detail certain illustrative aspects and implementations of the invention. These are indicative of but a few of the various ways in which the principles of the invention may be employed.

DETAILED DESCRIPTION OF THE INVENTION

Figure 1:
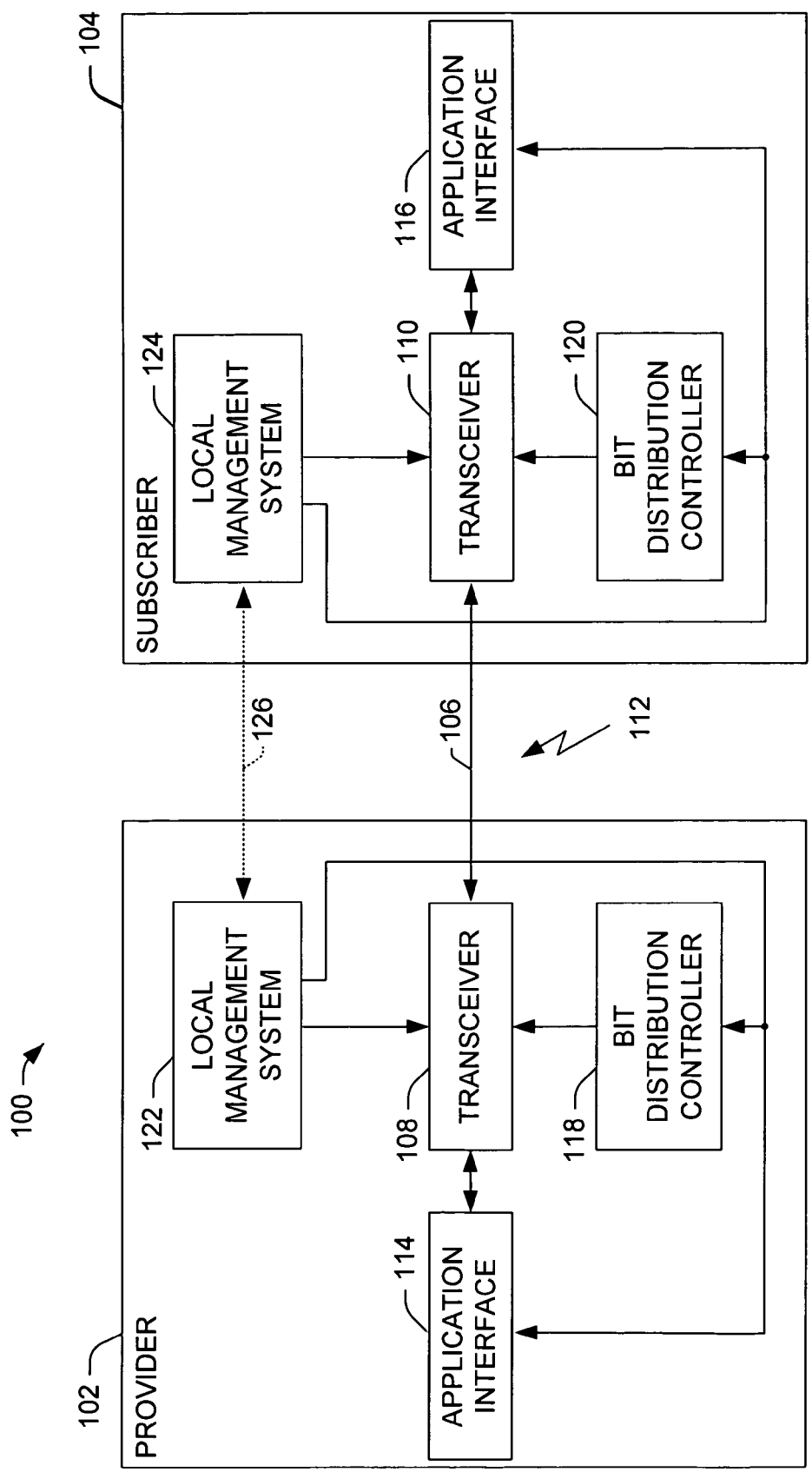
FIG. 1 is one embodiment of a multi-carrier DSL communication system.

The present invention will now be described with reference to the drawings wherein like reference numerals are used to refer to like elements throughout, and wherein the illustrated structures are not necessarily drawn to scale.

The invention relates to communication systems and methods for adaptive adjustment of system parameters to limit the adverse affects of one or more noise signals. Although the invention is illustrated in the context of a DSL multicarrier communication system using Discrete Multitone Transmission (DMT) modulation, the invention also finds utility in association with other communication systems, including but not limited to other DSL systems, single carrier communication systems, multicarrier communication systems, or any other communication system that may employ noise protection techniques. The various aspects of the invention may be carried out alone or in combination with various processes in a communication system.

FIG. 1 illustrates a multicarrier DSL communication system 100 in which one or more aspects of the invention may be implemented, comprising first and second DSL modems 102 and 104, respectively, coupled with a transmission line 106. One transmission line is a twisted pair or copper wires in a conventional residential telephone system, although the invention may be employed in communications systems employing any type of line by which data can be transferred between the modems. Exemplary modems are DSL modems having suitable circuitry for providing DSL communication service on the line generally in accordance with ANSI T1.413 (ADSL), T1.424 (VDSL) and other DSL standards, including the performance of the tasks and functions described herein. In various embodiments (not shown), aspects of the invention may be utilized by a single modem operated in "loopback" mode, wherein the single modem both transmits data onto the line and receives data from the line for analysis.

In the illustrated communication system 100, the first modem 102 may be a provider modem that is located at a DSL service provider premises. The second modem 104 may be a subscriber modem that is located in a residential home. Data is transferred in both directions along the line 106, wherein the provider modem 102 transmits data to be received by the subscriber modem 104, and the subscriber modem 104 transmits data to be received by the provider modem 102. In this regard, the exemplary communication system 100 is symmetrical, although the various aspects of the invention may be carried out in other systems in which data is transferred in only a single direction.

In order to appreciate the various aspects of the invention, the exemplary system and the various methods of the invention are hereinafter described with respect to data being transferred in a first direction from the provider modem 102 to the subscriber modem 104. Accordingly, in the following discussion, the first modem 102 (specifically, a transceiver 108 thereof) may be referred to as a "transmitter" and the second modem 104 (specifically, a transceiver 110 thereof) may be referred to as a "receiver" for purposes of describing the various aspects of the invention, with the second (receiver) modem 104 also monitoring and analyzing continuous and impulse noise and proposing noise protection parameter changes to the first (transmitter) modem 102, both of which then utilize the proposed parameters in the subsequent communication. However, it will be appreciated that both modems 102 and 104 are capable of transmitting and receiving data in the illustrated implementation, wherein the modems 102 and 104 may both be configured to monitor noise with respect to data received thereby and to selectively propose and to institute noise protection parameter changes in a cooperative manner with the other modem.

The exemplary first modem 102 comprises a transceiver 108 that is coupleable to the line 106 and operates to support communication (e.g., DSL) service with the second modem 104. With respect to received data from the second modem 104, the transceiver 108 operates to receive such data from the line 106. The first modem 102 also comprises an application interface 114 to a host system, such as a service subscriber's home computer (not shown), wherein the second modem 104 also comprises an application interface 116 with a network node (not shown).

In the first modem 102, the transceiver 108 provides for tone ordering or bit distribution, wherein outgoing data bits to be transmitted over each channel are encoded as signal points in signal constellations using bit distribution parameters provided by a bit distribution controller 118. The transceiver 108 of the first modem 102 modulates the outgoing channels by signal constellations (in the presented example using inverse discrete Fourier transform (IDFT)) and provides the modulated signals to the line 106 according to channel gain scale settings from the bit distribution controller 118. For incoming data received from the first modem 102, the transceiver 110 of the second modem 104 demodulates the received signals into individual channel constellations (e.g., by discrete Fourier transform or DFT techniques in the presented example), and decodes the received constellations according to the parameters from a corresponding bit distribution controller 120. The transceiver 110 of the second modem 104 provides demodulation of incoming data from the first modem 102 (in the presented example using discrete Fourier transform (DFT), and includes suitable analog circuits for interfacing with the communication line 106 for receipt of incoming data.

The local management systems 122 and 124 of the first and second modems 102 and 104, respectively, exchange control information and messages with one another via a local management channel 126, that employs one or several of the channels of the communication line 106 using any suitable communication or data exchange protocol, so as to coordinate parameters settings, rate adjustments, timing of changes, etc. In the illustrated communication system 100, the local management systems 122 and 124 may exchange settings and information via the management channel 126 during system initialization for establishing initial channel bit loading capacities and gain settings based on initial measurements of the channel continuous noise levels and signal-to-noise ratio (e.g., SNR). For instance, during initialization, the signal-to-noise ratio (SNR) for each channel may be obtained (by the receiving modem), and the maximum bit capacity of each channel may be determined by one of the modems 102, 104 (often based on the SNR measured at the receiver). This information is sent to the other modem, such that upon initiating DSL service, the modems are using the same parameters.

Figure 2:
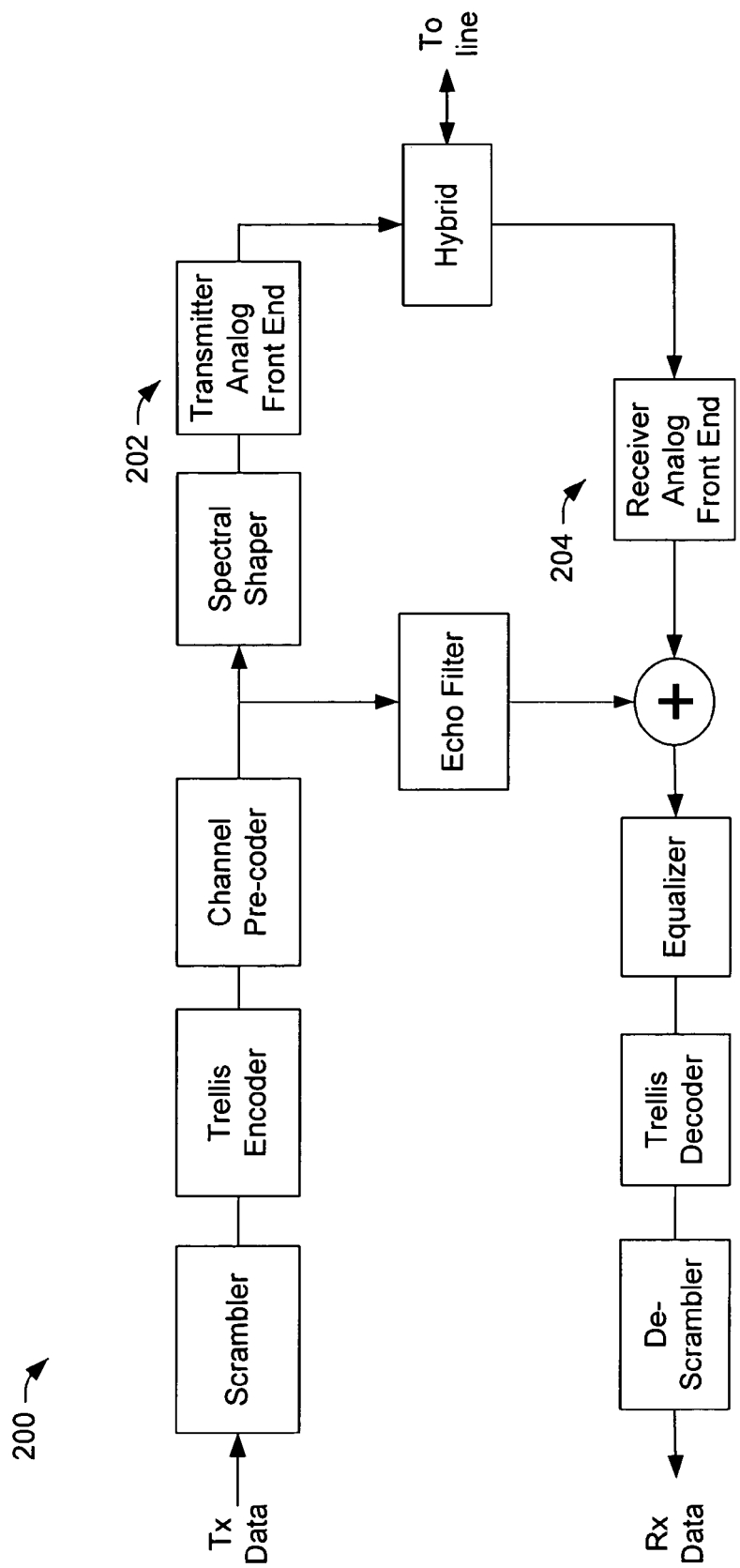
FIG. 2 is one embodiment of a transceiver of a DSL communication system.

FIG. 2 shows one transceiver 200 of a modem which may be coupled to line 106. As shown, the transceiver 200 includes a transmitter analog front end 202 for providing modulated signals to the line 106, as well as a receiver analog front end 204 for receiving the modulating signals from the line 106.

Figure 3A:
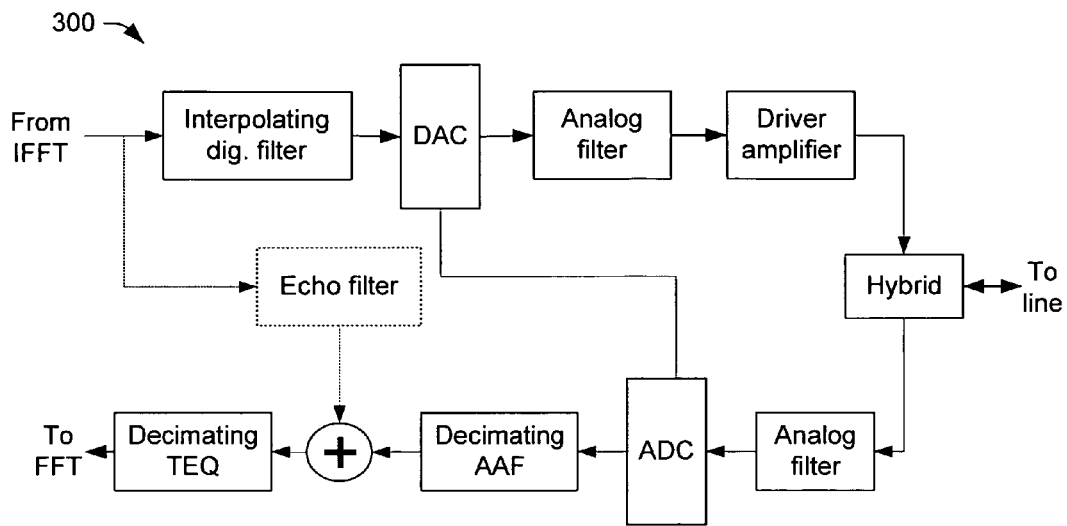
FIGS. 3A and 3B are embodiments of analog front ends of a DSL communication system.

FIG. 3A shows one transmitter analog front end 300 of a transceiver. The transmitter analog front end 300 includes suitable analog circuits for modulating and transmitting data on the line. In addition, surge protection devices, and special filters intended to share the transmission medium with other systems, like plain old telephone services (POTS) are connected to the modem. In general, transmitter analog front ends may include various filters, amplifiers, digital to analog converters, hybrids, transformers, and/or other suitable components. In FIG. 3A's illustrated embodiment, the transmitter analog front end 300 includes one or more integrated circuits and other discrete components. The outside devices, like surge protection, remote powering, and special filters (POTS/ISDN splitters) are not shown. Typically, some parts of the transmitter analog front end (for instance, hybrid and some filters) are implemented outside the modem for technological, cost and/or performance reasons. The point of separation may be the interface to/from the DAC and ADC. Thus, FIG. 3A includes more components than are typically on the transmitter analog front end chip.

Figure 3B:
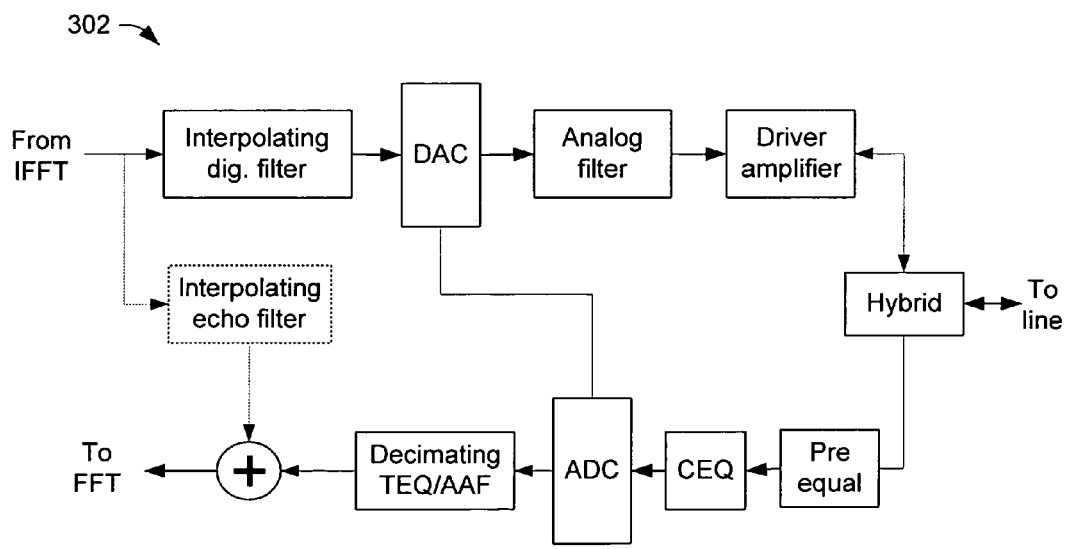

FIG. 3B shows one receiver analog front end 302 of a transceiver. The receiver analog front end 302 includes suitable analog circuits for modulating and transmitting data on the line. Similar to the analog front end of the transmitter, the receiver analog front end may include various filters, amplifiers, digital to analog converters, hybrids, transformers, special band-splitting filters (POTS filters) and/or other suitable components. In FIG. 3B's illustrated embodiment, the receiver analog front end 302 includes one or more integrated circuits and other discrete components. The outside devices, like surge protection, remote powering, and special filters (POTS/ISDN splitters) are not shown. Typically, some parts of the receiver analog front end are implemented outside the modem for cost and/or performance reasons. The point of separation may be the interface to/from the DAC and ADC. Thus, FIG. 3B includes more components than are typically on the receiver analog front end chip.

Virtual noise is used in conjunction with real noise that is received from the line to calculate the bit loading for each specific channel. If a modem measures a very low level of real noise during initialization, the modem can select a proper level for the virtual noise such that the modem will not assign too many bits for any channel and will not assign a too low value of the transmit power for any channel. If the modem knows probable ways in which the real noise on the line will vary, the modem can usually select the value of virtual noise so that the modem will experience small variations in error performance even if the real noise that the modem experiences has wide variations. Thus, virtual noise stabilizes performance of the modem.

Figure 4:
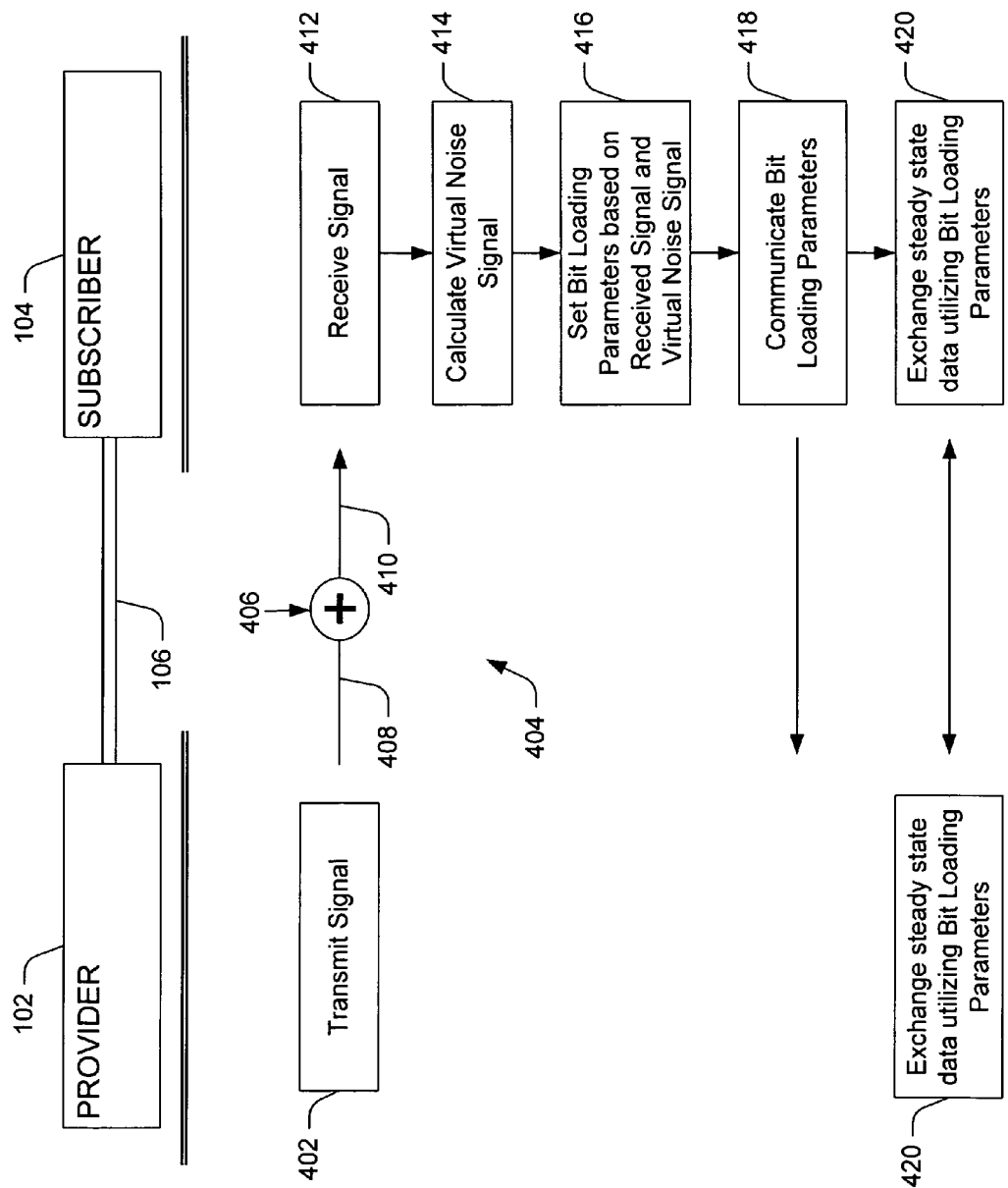
FIG. 4 is a chart illustrating a method of efficient communication in a DSL system.

FIG. 4 illustrates one embodiment 400 in which a virtual noise signal may be utilized to improve the performance stability of a DSL system. As shown, in step 402, a first modem 102 transmits a signal with a predetermined power spectral density (PSD) on the line 106 over a number of channels. In step 404, noise 406 on the line may affect the transmitted signal 408 to produce an altered signal 410. In step 412, the second modem 104 receives the altered signal 410, which may also be referred to as a received signal. In step 414, the second modem can calculate a virtual noise signal based on a network operator's prediction of possible noise variations, the modem's analysis of the accumulated history of operation over a particular line, and other factors. In step 416, the second modem 104 sets bit loading parameters based on the SNR of the received signal 410 and the obtained virtual noise signal. In step 418, the second modem 104 communicates the bit loading parameters to the first modem 102. In typical embodiments, steps (402, 404, 412, 414, 416, and 418) are carried out during initialization, after which the modems 102 and 104 exchange steady state data (420) by utilizing the set bit loading parameters. These steps are now discussed in more detail below.

In step 402, the first modem 102 can provide the transmitted signal 408 with a selected PSD on a number of channels. In general, the modem may transmit a unique power on each channel, although in typical embodiments the modem will provide the transmitted signal 408 at a PSD that is in accordance with a standardized protocol. For example, in one ADSL embodiment the first modem 102 could provide the transmitted signal 408 over any number of 256 available channels, each of which is 4.3125 Hz wide, and with PSD of the transmitted signal doesn't exceed −40 dBm/Hz.

In step 404, the transmitted signal 408 may be affected by several types of noise 406 on the line 106 to create an altered signal 410. The noise 406 on the line 106 may uniquely affect each of the channels utilized in the communication session. For example, in one ADSL embodiment, the $256^{th}$ channel could have significant noise (e.g., due to crosstalk), while the $25^{th}$ channel could have relatively little noise. Thus, the noise 406 may affect the transmitted signal 408 on one channel (e.g., the $256^{th}$ channel) more than another channel (e.g., the $25^{th}$ channel).

In step 412, the second modem 104 receives the altered signal 410, from the line 106. In typical embodiments, the second modem 104 will know the PSD of transmitted signal 408 that the first modem 102 transmitted over the line 106. Thus, the second modem 104 can measure the received power and received noise for each of the channels and determine SNR for each of the channels therefrom. Based on the SNR of each channel, the second modem 104 can determine which channels are most likely to have low noise and thus are most likely to provide error-limited data transmission if the noise condition in this channel worsens.

In step 414, the second modem 104 can calculate a virtual noise signal for each channel based on the received power and network operator's expectation of possible noise variations in this channel. The virtual noise signal may account for the expected deployment scenario of a particular DSL system and may account for expected variations from one modem to the next.

As used in one embodiment, the term "deployment scenario" may include, but is not limited to, variables related to: the attenuation of the line 106, the electromagnetic characteristics of the line, the number of systems connected to the line (number of potential crosstalkers), the attenuation of one or more analog front ends, the number of systems that may be simultaneously ON in a given binder, the time period and regularity with which systems are connected to the line, as well as many others. In one embodiment, the deployment scenario includes information related to specific channels that are known to be unstable. For instance, the modem can calculate the virtual noise based on an expectation that the number of crosstalkers can change from zero to the maximum number of DSL modems deployed in a cable binder, and the channel transfer function may experience the usual change in ambient temperatures for the region and deployment type (air or underground cable, for instance). The mentioned parameters (e.g., potential number of crosstalkers, or the range of temperatures) is usually known to the network operator and can be provided during system configuration.

As another example, the virtual noise signal may account for the fact that one transmitting modem may differ from another transmitting modem in the PSD of the transmitted signal 408. Because transmitter analog front ends (e.g., transmitter analog front end 202) may vary from one manufacturer to another, as well as the external to the modem part of the analog front end described above, tolerances associated with the PSD of the transmitted signal 408 may vary from one modem to the next. Similarly, because the attenuation of transmitter analog front ends may vary from one modem to the next, the PSD of the transmitted signal 408 may vary from one modem to the next. Prior art DSL systems fail to take into account such variations.

Similarly, the virtual noise signal may account for the fact that one receiving modem may vary from another receiving modem in how it receives the received signal 410. Because real-world modems vary in how their receiver analog front ends (e.g., receiver analog front end 204) are designed, and which specific external components they include, the tolerances associated with measuring the received signal may vary from one modem to the next. Since network operator can't account the mentioned tolerances in the transmitter analog front end and receiver analog front end, setting the same virtual noise will cause different bit loading for different modems, which could result in communication errors due to unstable operation (if the bit loading is too high), or in unjustified low bit rate (if bit loading is too low). One way to avoid this is to calculate virtual noise accounting the value of the actually received signal on every channel virtual noise is applied. Prior art DSL systems fail to take into account the effect of different receiver analog front ends.

Figure 5:
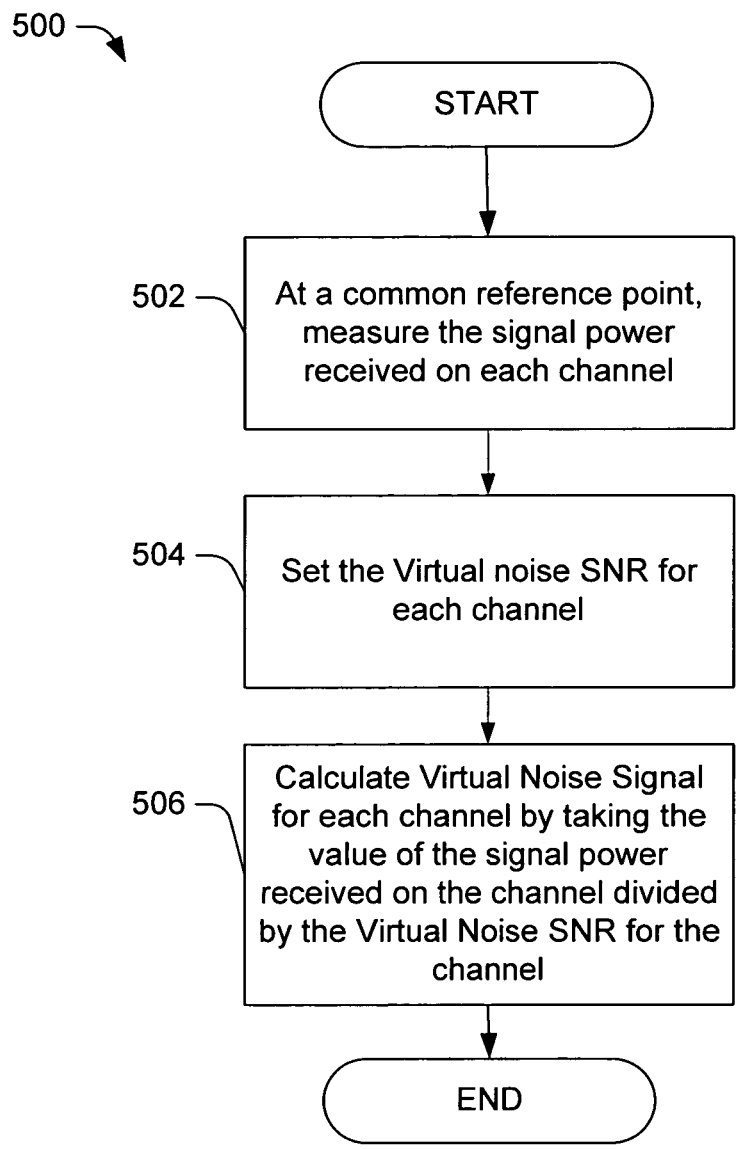
FIG. 5 is one embodiment of a flowchart illustrating a method of efficient communication in a DSL system.

FIG. 5 illustrates one method 500 for calculating a virtual noise signal. At step 502, a modem measures the signal power of each channel at a common reference point of the receiver. In step 504, the management system sets a virtual noise SNR for each channel at the common reference point of the receiver. In step 506, the virtual noise signal for each channel is computed equal to the received signal power for that channel divided by the virtual noise SNR assigned for that channel.

The management system can assign a pattern of virtual noise SNR, which may be scaled depending on the received signal power and line length.

In one embodiment the virtual noise signal is proportional to the signal power at a common reference point where the virtual noise signal is introduced. For example, the virtual noise signal may be proportional to the received power at the point where the receiving modem connects to the line. To provide the same SNR relative to the virtual noise, the virtual noise power may be proportional to the signal power at the point virtual noise is introduced (e.g, a common reference point inside the signal processing unit of the transceiver). Similarly, the reference point may be defined at the output of the transmitter 102 (where the transmitter is connected to the line) or any other point in the middle of the line. For all of these points the desired virtual SNR can be maintained. The corresponding virtual noise PSD is computed as the PSD or the transmit signal at the reference point divided by the desired virtual SNR.

With the described settings, the virtual noise SNR relative to the near-end crosstalk (NEXT) will be inversely-proportional to the line attenuation and the NEXT-coupling coefficient, but may be independent of the receiver analog front end. The same effect could be achieved if virtual noise signal is proportional to the actual received signal at the point where the virtual noise signal is introduced (e.g., a common reference point inside the signal processing unit of the transceiver).

In addition, if the receiving modem knows the value of the transmitted PSD of other DSL signals in the line (PSD of potential crosstalkers), the virtual noise signal could be linked with average crosstalk patterns. By linking these parameters, performance could be nearly independent of crosstalk with little or negligible performance reduction.

In one embodiment, aspects of the invention may be used to limit crosstalk within a binder, wherein crosstalk is the sum of far-end crosstalk (FEXT) and near-end crosstalk (NEXT) and wherein the binder includes a series of pairs of twisted copper wires. As electromagnetic signals are transmitted on the series of twisted copper pairs, signals on one copper pair (disturbing pair) may interfere with signals on another copper pair (victim pair).

Typically, FEXT is proportional to: the FEXT-coupling coefficient between the disturbing pair and the victim pair, the length of the coupled part of the disturbing pair and the victim pair, and to the attenuation of the victim pair. The NEXT may be proportional to the NEXT-coupling coefficient and may be independent of either the length or the attenuation of the interfering pairs. Thus, the SNR relative to FEXT may depend on the line length and the FEXT-coupling coefficient, but does not depend on the attenuation of the receiver analog circuitry.

In one embodiment, the deployment scenario includes FEXT that affects the transmitted data on the line. We can obtain the value of the SNR at the common reference point at the output of the analog front end of the receiver by using the following set of equations for FEXT coupling:

$$FEXT[f, n, l] = S(f) \cdot |H_L(f)|^2 \cdot X_F \cdot n^{0.6} \cdot l \cdot f^2 \qquad (1)$$

$$Rx(f, l) = S(f) \cdot |H(f)|^2, \qquad (2)$$

$$SNR_{FEXT} = \frac{Rx}{FEXT(f) \cdot |H_{AFE}(f)|^2} = \frac{1}{X_F \cdot n^{0.6} \cdot l \cdot f^2}, \qquad (3)$$

where $|H(f)|=|H_L(f)| \cdot |H_{AFE}(f)|$ is the magnitude of the total insertion gain transfer function affecting the signal, $X_F=7.74 \times 10^{-21}$, n=number of DSL modems turned ON in the cable binder, l=the FEXT coupling path length in feet, f=frequency in Hz, and S(f) is the power spectrum of the transmitted signal (e.g., PSD signal 408). In this example, we assume for simplicity that the disturbing pair and victim pair have the same power spectrum at the point of coupling with the victim system. The gain transfer function components $H_L(f)$ and $H_{AFE}(f)$ describe the transmission line and the receiver analog front end, respectively. As shows equation (3), the SNR due to FEXT doesn't depend on the transfer function of the analog front end, as well as on transfer function of the line, though variation of these parameters will not change the performance under real noise conditions.

In the case of the virtual noise signal is intended to emulate FEXT disturbers, following equation (1), the operator has to know the transfer function of the line, the line length, and the transfer function of the analog front end. However, all these three components are generally unknown. In addition, even when all the modems use the same line (same $H_L(f)$, and same l), the analog front end characteristics of different modems can be different. As the equation (3) above shows this will not impact on the performance in real noise conditions, but will impact the performance as the system is tested under virtual noise signal in attempt to emulate real noise conditions.

An alternative way is to set a PSD of the virtual noise signal proportional to the PSD of the received signal estimated at the common reference point where the virtual noise signal is introduced. With this approach, we get the value of SNR produced by both FEXT and virtual noise as:

$$SNR_{FEXT\_VN} = \qquad (4)$$
$$\frac{Rx(f)}{FEXT(f) \cdot |H_{AFE}(f)|^2 + Rx(f) \cdot g(f)} = \frac{1}{X_F \cdot n^{0.6} \cdot l \cdot f^2 + g(f)}.$$

where the introduced virtual noise is: $VLN(f)=Rx(f) \cdot g(f)$, i.e., proportional to the received signal Rx(f).

With this approach the SNR is completely independent of the analog front end characteristics of the specific modem, which provides repetitive performance tests. The introduced value of the virtual noise signal is:

$$VLN(f)=Rx(f) \cdot g(f), \qquad (5)$$

and, accordingly, $$g(f) = \left(\frac{Rx(f)}{VLN(f)}\right)^{-1} = \frac{1}{SNR_{VLN}(f)}. \quad (6)$$

Equation (6) shows the virtual noise signal can be defined as a kind of "background SNR" which can be applied to all channels to define the bit loading. From equation (4) one can notice that the SNR value is also insensitive to the variations in the line gain transfer function, similar to (3).

Figure 6:
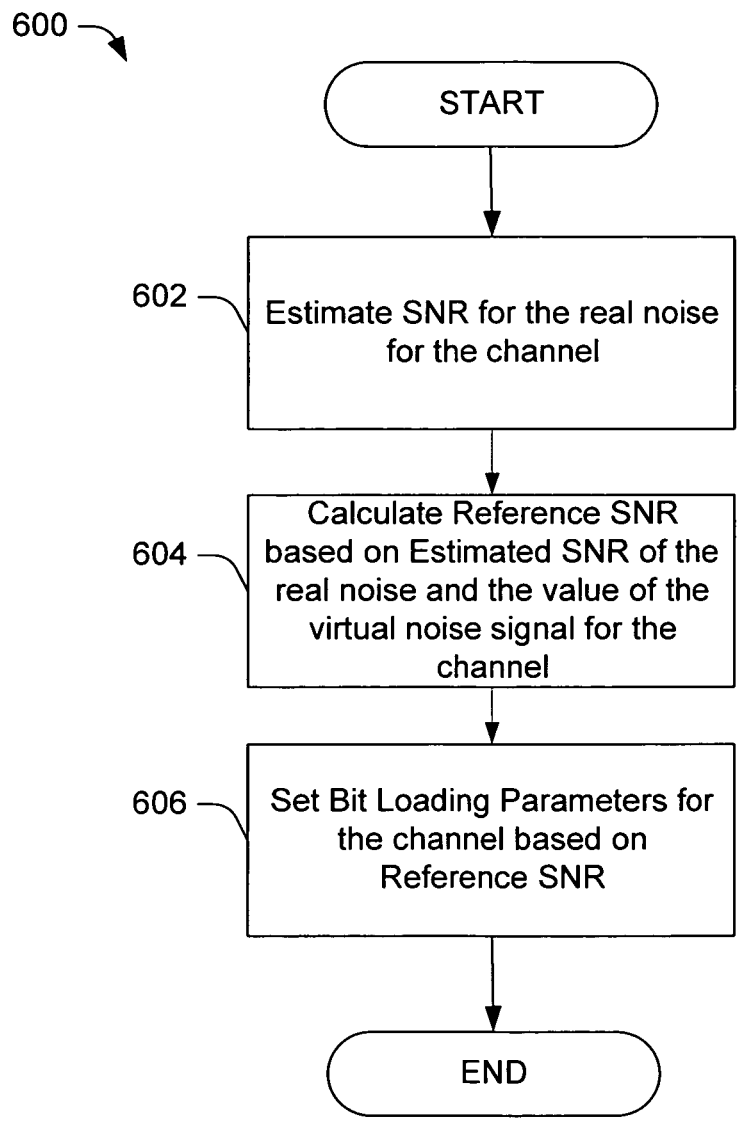
FIG. 6 is one embodiment of a flowchart illustrating a method of efficient communication in a DSL system.

FIG. 6 illustrates one procedure 600 to define bit loading. In step 602, an estimate is made for the SNR(n) of the real noise for the specific channel (n is the channel index). In step 604, a Reference SNR is computed based on the sum of the real noise (SNR(n)) and predefined virtual noise ($SNR_{VLN}$(n)). In step 606, the bit loading is set for the specific tone based on the Reference SNR.

The proposed procedure may be even more efficient when NEXT is the main disturber, because the PSD of virtual noise signal in this case may depend on the attenuation of the specific line.

In one embodiment, virtual noise signal could be set based on worst-case crosstalk impact from several lines. The impact of FEXT with the number of disturbers in can be expressed by a coefficient:

$$h_{FEXT} = 10\log\frac{FEXT(n)}{FEXT(n=1)} = 6\log(n). \quad (7)$$

Since logarithmic function saturates quickly, the $h_{FEXT}$ grows very slowly for n>3. As shown in Table 1,

TABLE 1

Logarithmic values of FEXT coupling

| Number of disturbers, n | $h_{FEXT}$, dB |
|---|---|
| 20 | 7.81 |
| 12 | 6.48 |
| 10 | 6.00 |
| 8 | 5.42 |
| 6 | 4.67 |
| 5 | 4.19 |
| 4 | 3.61 |
| 3 | 2.86 |
| 2 | 1.81 |
| 1 | 0.00 | if the assigned value of virtual noise signal reflects 3-4 worst case disturbers and 6 dB of margin is applied when bit loading is defined, the system will not operate with zero or negative margin with any higher number of crosstalkers. Thus, the system can provide low-error performance independent of the number of systems operating inside the binder and whether some systems are switched on or off.

In the case of FEXT from a particular number of disturbers, n, the defined virtual noise SNR ($SNR_{VLN}$) depends on the line length l. The value of n is expected to be set by the operator, while l may be provided by the system. The latter can be either estimated using the line attenuation (so-called electrical length) or both line attenuation and latency. The latter combination usually allows obtaining line length rather accurately.

Keeping in mind this approach, one can compute the bit loading using the Reference SNR, as described below, although the maximum allowed bit loading for the channel n, MBL(n), can be derived directly from $SNR_{VLN}$ (assuming that no noise is received from the line) using the equation:

$$MBL = \log_2\left(1 + 10^{\frac{SNR_{VLN}-M-\Gamma}{10}}\right), \quad (8)$$

Where M is the desired SNR margin (usually 6 dB) and Γ is a constant usually called SNR-gap.

Thus, a system can set the maximum bit loading for each tone for specific deployment scenario. The received power for a series of channels is measured. The line length (e.g., for cases where FEXT is assumed the main disturber, like VDSL) may be estimated. Based on the SNR pattern introduced by the management system (number of virtual disturbers, FEXT or NEXT or both) and based on the received power and/or the line length, the Virtual Noise SNR is computed for at least one of the channels. The Reference SNR is computed for the at least one of the channels based on the sum of the real noise SNR and virtual noise $SNR_{VLN}$ for the at least one of the channels. Bit loading is set for each of the at least one of the channels based on the Reference SNR.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A communication system, comprising:
   a modem configured to be selectively coupled to a communication line on which a plurality of channels can be established;
   wherein the modem is configured to receive a signal via the communication line, and configured to calculate a bit loading parameter for at least one of the plurality of channels based on a virtual noise signal;
   where the virtual noise signal is based on the power of the signal as received at the modem, a deployment scenario, and a characteristic of one of multiple different types of analog front end that can transmit the signal to the modem.

2. The communication system of claim 1, wherein the deployment scenario relates to an electromagnetic characteristic of the communication line or to how the modem is arranged within the communication system relative to other modems in the communication system.

3. The communication system of claim 1, wherein the virtual noise signal accounts for a tolerance or an attenuation of the one of multiple different types of analog front end from which the signal is transmitted to the modem.

4. The communication system of claim 1, wherein the virtual noise signal accounts for a tolerance in power with which the signal was transmitted.

5. A method for performing bit loading for a DSL communication system, comprising:
- measuring the power of a received signal for at least one of a plurality of channels; and
- calculating a virtual noise signal based on the power of the received signal, a deployment scenario, and an expected variation in components between different modems.

6. The method of claim 5, further comprising:
- calculating bit loading parameters for at least one of the plurality of channels based on the power of the received signal, a power of a received noise, and the virtual noise signal.

7. The method of claim 6, wherein the virtual noise signal accounts for the tolerance or the attenuation of the analog front end.

8. The method of claim 5, wherein the power of the received signal and the received noise are measured at the input of a modem in which the modem component is located.

9. The method of claim 8, wherein the virtual noise signal accounts for a tolerance with which the received power was transmitted.

10. The method of claim 5 wherein the virtual noise signal accounts for a characteristic of an analog front end.

* * * * *